(12) United States Patent
Bourcier et al.

(10) Patent No.: US 7,903,389 B2
(45) Date of Patent: *Mar. 8, 2011

(54) CELLULAR HONEYCOMB ULTRACAPACITORS AND HYBRID CAPACITORS WITH SEPARATOR-SUPPORTED CURRENT COLLECTORS

(75) Inventors: Roy Joseph Bourcier, Corning, NY (US); Kishor Purushottam Gadkaree, Big Flats, NY (US); Mallanagouda Dyamanagouda Patil, Corning, NY (US); Huan-Hung Sheng, Horseheads, NY (US); Mark J Soulliere, Corning, NY (US)

(73) Assignee: Corning Incorporated, Corning, NY (US)

( * ) Notice: Subject to any disclaimer, the term of this patent is extended or adjusted under 35 U.S.C. 154(b) by 504 days.

This patent is subject to a terminal disclaimer.

(21) Appl. No.: 12/084,188

(22) PCT Filed: May 26, 2006

(86) PCT No.: PCT/US2006/020565
§ 371 (c)(1),
(2), (4) Date: Apr. 25, 2008

(87) PCT Pub. No.: WO2006/130512
PCT Pub. Date: Dec. 7, 2006

(65) Prior Publication Data
US 2009/0185328 A1    Jul. 23, 2009

Related U.S. Application Data

(60) Provisional application No. 60/686,354, filed on May 31, 2005.

(51) Int. Cl.
*H01G 9/00* (2006.01)
(52) U.S. Cl. ......... 361/502; 361/503; 361/504; 361/509; 361/512; 361/523
(58) Field of Classification Search .................. 361/502, 361/503–504, 508–512, 516–519, 523–529, 361/303–305, 301.4, 301.2
See application file for complete search history.

(56) References Cited

U.S. PATENT DOCUMENTS 5,142,451 A * 8/1992 Kurabayashi et al. ........ 361/502

(Continued)

FOREIGN PATENT DOCUMENTS

WO          WO03049224 A1      6/2003 .......................... 10/4

OTHER PUBLICATIONS

Andrew Burke "Ultracapacitor Technology: Present and future performance and applications," Advanced Capacitor World Summit, Jul. 14-16, 2004, speaker 12.

(Continued)

*Primary Examiner* — Nguyen T Ha
(74) *Attorney, Agent, or Firm* — Michael W. Russell

(57) ABSTRACT

An ultracapacitor or hybrid capacitor includes an electrically non-conductive rigid or semi-rigid porous honeycomb separator structure having cells extending along a common direction and supporting current collector structure(s) thereon. The current collector structure may be porous and extend continuously on all inner surfaces of a cell of the honeycomb structure, or may extend along the common direction on separate portions of the inner surfaces of a cell. The material may desirably be an oxide or non-oxide ceramic, such as cordierite, silicon nitride, aluminum titanate, alumina, zircon, glass, or glass-ceramic.

10 Claims, 5 Drawing Sheets

U.S. PATENT DOCUMENTS

| | | | |
|---|---|---|---|
| 6,201,685 B1 | 3/2001 | Jerabek et al. | 361/502 |
| 6,212,062 B1 | 4/2001 | Day et al. | 361/502 |
| 6,225,733 B1 | 5/2001 | Gadkaree et al. | 313/352 |
| 6,233,135 B1 * | 5/2001 | Farahmandi et al. | 361/502 |
| 6,304,426 B1 | 10/2001 | Wei et al. | 361/502 |
| 6,392,868 B2 * | 5/2002 | Ohya et al. | 361/502 |
| 6,426,865 B2 * | 7/2002 | Kasahara et al. | 361/512 |
| 6,487,066 B1 | 11/2002 | Niiori et al. | 361/502 |
| 6,565,701 B1 | 5/2003 | Jerabek et al. | 156/305 |
| 6,697,249 B2 * | 2/2004 | Maletin et al. | 361/502 |
| 6,714,391 B2 | 3/2004 | Wilk et al. | 361/15 |
| 6,738,252 B2 | 5/2004 | Okamura et al. | 361/502 |
| 6,885,545 B2 * | 4/2005 | Michel et al. | 361/502 |
| 2004/0085710 A1 | 5/2004 | Takeuchi et al. | 361/502 |
| 2009/0021890 A1 * | 1/2009 | Bourcier et al. | 361/502 |
| 2009/0303663 A1 * | 12/2009 | Bourcier et al. | 361/523 |

OTHER PUBLICATIONS

Jim P. Zheng "The Limitations of energy density of battery/double layer capacitor asymmetric cells" Journal of the Electrochemical Society, 150 (4) A484-A492 (2003).

* cited by examiner

Figure 5
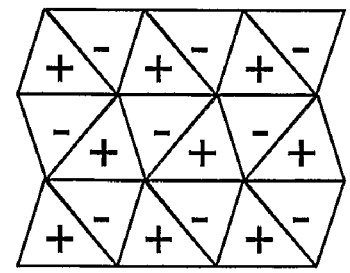
Figure 6
Figure 7
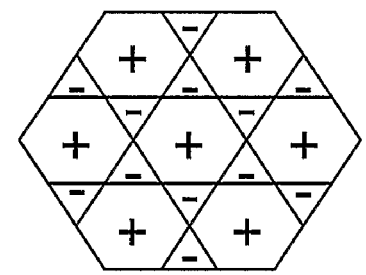
Figure 8

US 7,903,389 B2

CELLULAR HONEYCOMB ULTRACAPACITORS AND HYBRID CAPACITORS WITH SEPARATOR-SUPPORTED CURRENT COLLECTORS

This application claims the benefit of priority under 35 U.S.C. §119(e) of U.S. Provisional Application Ser. No. 60/868,354 filed on May 31, 2005.

BACKGROUND OF THE INVENTION

1. Field of the Invention

The present invention relates generally to ultracapacitors and hybrid capacitors, and particularly to high energy density and high power density ultracapacitors and hybrid capacitors employing cellular honeycombed separator structures with current collectors supported thereon, and to methods for producing the same.

2. Technical Background

Ultracapacitors, also commonly referred to as electric double layer capacitors, are potentially useful for many applications where pulse power or power leveling is desirable or required. These applications range from small devices such as cell phones to large devices such as hybrid vehicles. The energy and power density of ultracapacitors known today is not as high as would be generally desired for various applications, including hybrid vehicles. A durable, easily manufactured, high energy density and/or high power density device is thus desirable.

SUMMARY OF THE INVENTION

According to one aspect of the present invention, an ultracapacitor or hybrid capacitor device includes an electrically non-conductive rigid or semi-rigid porous honeycomb structure having cells extending along a common direction, and supporting on an inner surface of the cells a current collector structure. Electrodes are contained within and extend along the cells, at least some of which electrodes are high-surface-area non-galvanic electrodes. An electrolyte is in contact with the electrodes via the pores of the porous honeycomb structure. All of the electrodes may be of the high-surface-area non-galvanic type, such that the resulting device is an ultracapacitor, or some of the electrodes may be galvanic electrodes, such that the resulting device is a hybrid capacitor.

The current collectors may be supported on the inner surfaces of the cells of the honeycomb structure may be as thin as 20 microns, 10 microns, or even 5 microns. The current collector structure may cover the entire inner surface of a cell for at least a certain distance along the cell. In such a case, the current collector structure is also porous, allowing the electrolyte to contact opposing electrodes via the pores of the current collector and the pores of the honeycomb separator structure. In an alternate embodiment, the current collector structure may be supported on only a portion of the inner surface of a cell, such as at inner corners the cell. In such a case, the current collector structure may be porous or nonporous.

The average cell density of the honeycomb structure is desirably greater than 15.5 cells per square centimeter, and may desirably be even higher: as high as 31, 62, or even 124 or more cells per square centimeter.

The porous honeycomb structure of the present invention is desirably formed of a material that is stable at temperatures of 300° C. or more, such that high temperature processing can be used to help ensure high purity of the final product. The material is desirably an oxide or non-oxide ceramic, such as cordierite, silicon nitride, or aluminum titanate, alumina, zircon, glass, or glass-ceramic.

In one variation of the present invention, cells of the honeycomb structure may be of non-uniform size, and the sizes or size differences of the cells may be optimized for use with specific hybrid capacitor chemistry.

In another aspect of the present invention, methods are provided for making the inventive devices described herein.

Additional features and advantages of the invention will be set forth in the detailed description which follows, and in part will be readily apparent to those skilled in the art from that description or recognized by practicing the invention as described herein, including the detailed description which follows, the claims, as well as the appended drawings.

It is to be understood that both the foregoing general description and the following detailed description present embodiments of the invention, and are intended to provide an overview or framework for understanding the nature and character of the invention as it is claimed. The accompanying drawings are included to provide a further understanding of the invention, and are incorporated into and constitute a part of this specification. The drawings illustrate various embodiments of the invention, and together with the description serve to explain the principles and operations of the invention.

BRIEF DESCRIPTION OF THE DRAWINGS

FIG. 5 is a diagrammatic cross-sectional view of one cell geometry useful in the context of the present invention.

FIG. 6 is a diagrammatic cross-sectional view of an alternative cell geometry useful in the context of the present invention.

FIG. 7 is a diagrammatic cross-sectional view of another alternative cell geometry useful in the context of present invention.

FIG. 8 is a diagrammatic cross-sectional view of still another alternative cell geometry useful in the context of the present invention.

DETAILED DESCRIPTION OF THE PREFERRED EMBODIMENTS

Figure 1:
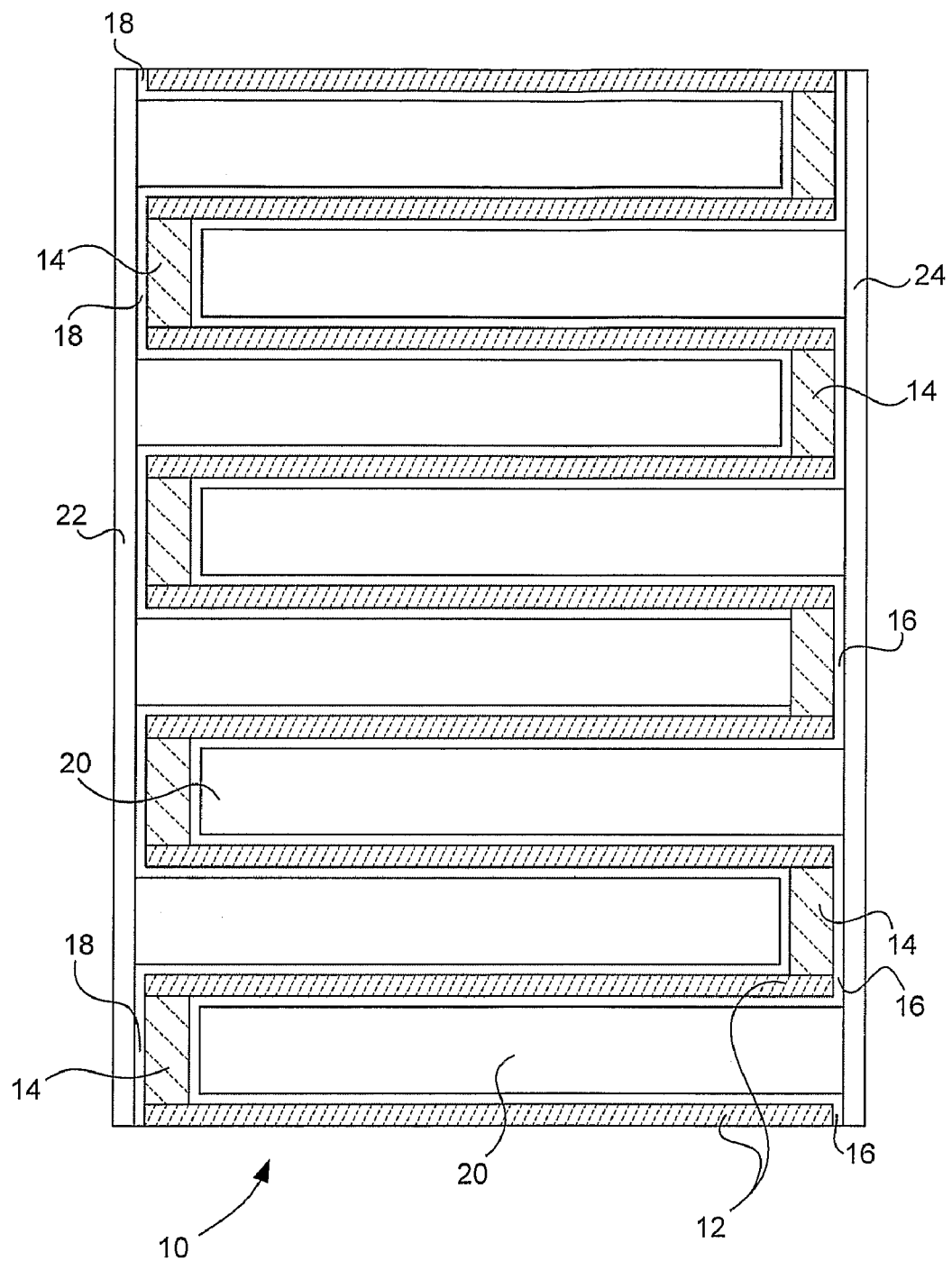
FIG. 1 is a diagrammatic cross-section of an ultracapacitor device according to the present invention.

Reference will now be made in detail to the present preferred embodiment(s) of the invention, examples of which are illustrated in the accompanying drawings. Whenever possible, the same reference numerals will be used throughout the drawings to refer to the same or like parts.

FIG. 1 shows a cross-section of one embodiment of an ultracapacitor or hybrid capacitor device 10 according to the present invention. The ultracapacitor device 10 is formed on and in a rigid or semi-rigid ceramic or polymer honeycomb structure 12, seen in FIG. 1 in cross-sectional view only, with the cells of the honeycomb extending along in the leftward and rightward direction within the figure. The honeycomb structure 12 is porous to allow an electrolyte to permeate the walls between adjacent cells within the honeycomb structure, so as to contact opposing electrodes via the pores.

Honeycomb structures have very high surface area to volume ratio, allowing for the achievement of easy migration of charge via an electrolyte through the walls of the structure 12. In addition, the open volume fraction of the honeycomb structure 12 may be controlled by controlling the wall thickness and cell density. Use of a honeycomb separator structure provides not only separation but also structural strength and integrity in the completed device. As will be explained more fully below, these attributes can be used to create a robust, high energy and/or power density, compact ultracapacitor or hybrid capacitor device.

Although the honeycomb structure 12 may comprise thermoplastic and/or thermoset polymers such as PTFE (polytetrafluoroethylene), PVDF (polyvinylidene fluoride) Polypropylene, Polyethylene, Polycarbonate, epoxy, phenolic etc., the honeycomb structure is more desirably fabricated (1) from either ceramic material such as cordierite, alumina, aluminum titanate, mullite, zircon, glass, or glass-ceramic or (2) from any other oxide or non-oxide ceramic—e.g., SiC, Si4N4, etc., that is electrically non-conducting. These ceramic materials can easily withstand processing temperatures of 300° C. or more. This is significant, as typical ultracapacitor and hybrid capacitor chemistries are very sensitive to any impurity in the electrolyte or electrode materials. In particular, the highest performing organic electrolyte solutions are very sensitive to water, and best performance can only be obtained in the absence of water. The option of processing the separator material at very high temperature provides an easy method of quickly achieving very low impurities and very low water content in the final product. A more traditional polymer separator lacks this advantage.

As noted above, the porous wall of the honeycomb is utilized as a separator between adjacent cells of the honeycomb structure. Adjacent cells are desirably blocked at opposite ends of the cells by plugs 14 as shown in FIG. 1.

Current collectors 16 and 18 are formed on and supported by the honeycomb structure 12. Current collectors 16 and 18 may desirably be provided in the form of porous conductive layers coated or deposited or otherwise conformed to the walls of the honeycomb structure 12. Current collectors 16 and 18 are structured so as to avoid extending substantially through the porous wall of honeycomb structure 12, such that there is no electrical contact between adjacent cells within the honeycomb structure 12 except via the electrolyte employed. Because current collectors 16 and 18 are supported on honeycomb separator structure 12, they need not be sufficiently thick to be self-supporting, and may generally be thinner than current collector structures in more traditional ultracapacitor or hybrid capacitor designs. Structures 16 and 18 are desirably least as thin as 20 microns or thinner, and more desirably at least as thin as 10 microns.

The honeycomb cells defined by the walls of the honeycomb structure 12 contain a high-accessible-surface-area electrode material 20 suffused with an electrolyte solution, which solution also permeates the conductive layers 16 and 18 and the porous walls defined by the honeycomb structure 12. Electrolytes useful in the present invention include, for example, aqueous electrolytes such as H2SO4, KOH, and organic solvent based electrolytes such as tetraethylammonium tetrafluoroborate in either propylene carbonate or acetonitrile, and others known in the art.

The electrode material 20 is chosen from non-galvanic materials, i.e., materials that do not undergo faradaic reactions in the selected electrolyte solution within the intended operating voltage range of the device. Such non-galvanic electrode material may desirably be a carbon paste containing activated carbon and/or carbon nanotubes, carbon aero-gel powder, and one or more of graphite powder, carbon black, carbon nanofibers, etc., optionally with a binder such as a fluoropolymer. Non-carbon materials may also be used.

As an alternative embodiment, some of the cells formed by the honeycomb structure may be filled with one or more chemically active electrode materials so as to form a hybrid capacitor. Such chemically active or "galvanic" electrode materials known in the art as useful in forming a hybrid capacitor include, for example, iron oxide, ruthenium oxide, lead oxide, manganese oxide and lithium titanate. Both conductive filler and binder are optional. Binder, if present, may be a fluoropolymer or other suitable material.

The opposite ends of the device 10 are desirably connected to a metal foils 22 and 24 or other convenient current collectors to form the electrical terminals of the device 10. While it will be readily recognized that other electrical interconnection patterns are possible, it is deemed desirable that every cell border only cells of opposite polarity, and that one pole is located at one end of the device at foil 22, for example, and the other pole is opposite at foil 24.

Figure 2:
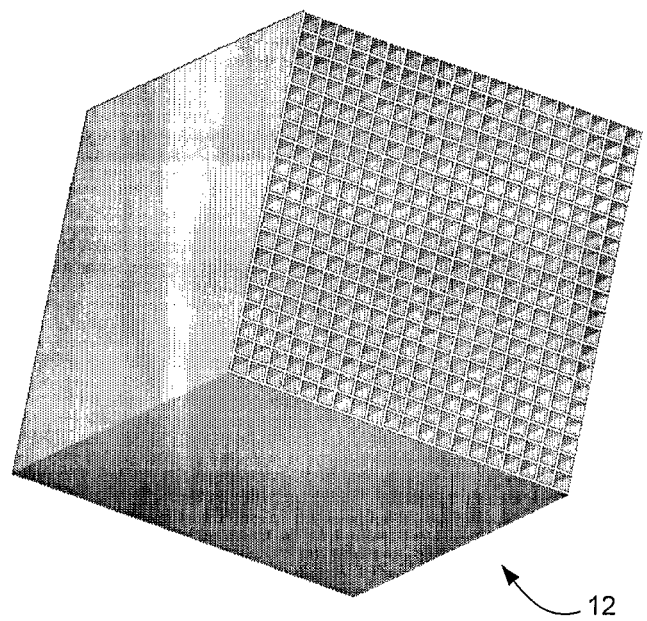
FIG. 2 is a perspective view of one embodiment of a honeycomb separator structure useful in some of the devices and methods of the present invention.

FIG. 2 shows a perspective view of an embodiment of a honeycomb separator structure 12 useful in the devices and methods of the present invention. In this embodiment, each cell is square and of the same dimensions. The walls of individual cells of the structure 12 are what is seen of structure 12, in cross-section, in FIG. 1 as described above.

Figure 3:
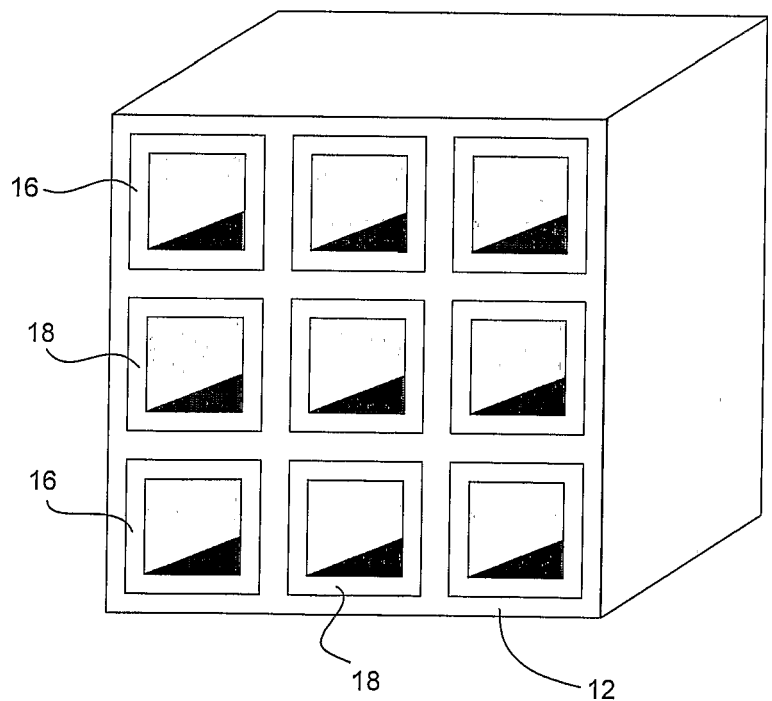
FIG. 3 is an elevational perspective showing one embodiment of current collectors of the present invention.

FIG. 3 shows a simplified perspective view of a honeycomb structure 12 (like that of FIG. 2) that has been coated with current collector structures 16 and 18. (The low number of cells of the honeycomb structure 12 and the substantial relative thickness of the current collector structures 16 and 18 are both exaggerations for ease of illustration). The current collector structures 16 and 18 extend along the common direction of the cells within the honeycomb structure and cover the entire inside surface of the cells. In such an embodiment, the current collector structures are also porous so as to allow the electrolyte to permeate both the current collector structures 16 and 18 and the walls of the honeycomb structure 12.

Figure 4:
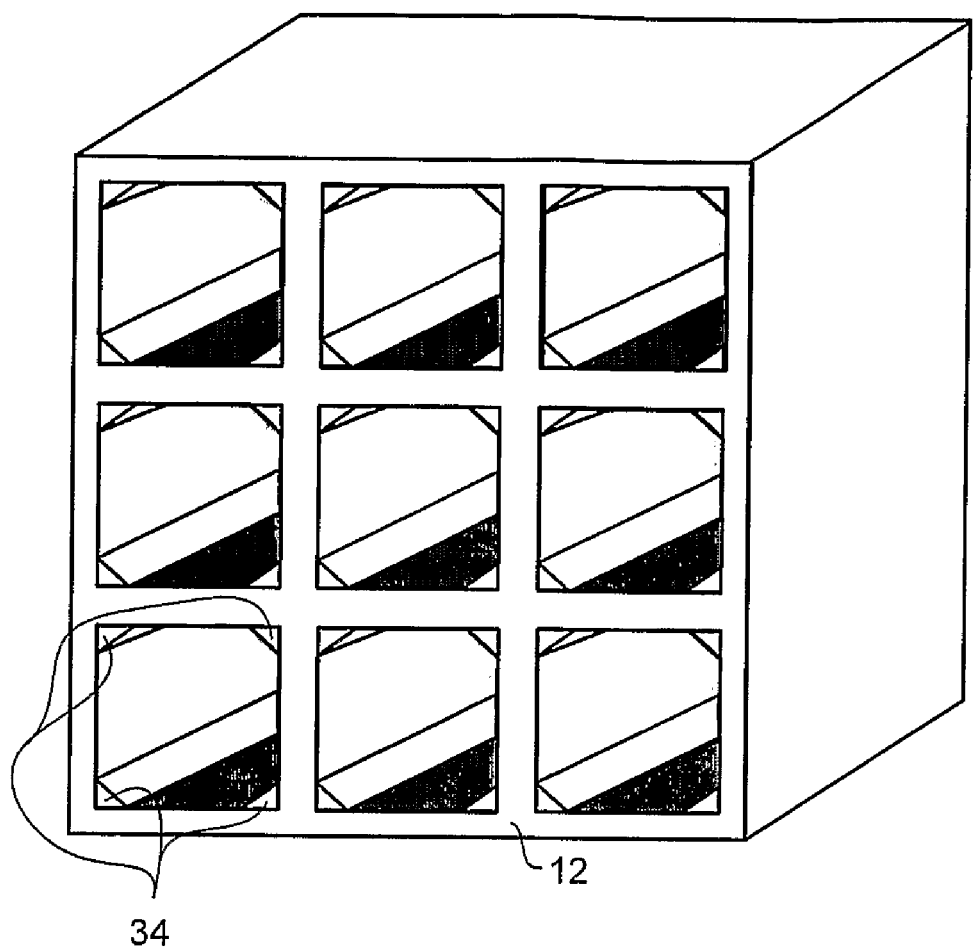
FIG. 4 is an elevational perspective showing another embodiment of current collectors of the present invention.

As an alternative embodiment of the present invention the current collector structures 16 and 18 need not cover the entire inside surface of the respective cells. FIG. 4 is a simplified perspective view similar to FIG. 3, of an alternative embodiment of the present invention, in which a current collector structure 34 extends along the common direction of the cells on a plurality of discontinuous portions of the inside surface of a given cell, in this case, on the inside corner portions of the inside surface of the cell. The current collector structure 34 of FIG. 4 may be prepared, for example, by first coating the entire inner surface of the cells as with structures 16 and 18 of FIG. 3, then etching back the continuous structures 16 and 18 so as to leave material only in the corners thereby forming structure 34. Alternatively, a deposition process that preferentially deposits in the corners may be used. The current collector structure 34 or conductive layer structure of the embodiment of FIG. 4, by leaving bare the walls that lie directly between adjacent cells, allows minimum separation of the electrode materials in adjacent cells while still providing good current collector presence within the cells with four separate parallel corner conductive lines extending along the common direction within each cell. The conductive material of which current collector structure 34 is comprises may be either porous or non-porous.

There are several advantages to the present invention compared to other presently available technologies. Because the current collector structures are supported directly on a rigid or semi-rigid separator structure, the current collector structures can be very thin, allowing more of the volume of the inventive devices to contain high-surface electrode material.

Present ultracapacitor designs typically contain only about 40-45% (by volume) of high-surface-area electrode material, the key material needed for high energy and power density. In contrast, a ceramic honeycomb structure with 400 cells per square inch (62 cells per square centimeter) and a 5 mil (125 micron) wall thickness, for example, has an open frontal area (OFA) of 80%. With the use of the relatively thin current collector structures enabled by the present invention, this means that nearly 80% of the total volume is available to fill with active material in such a structure. A 900 cell per square inch (139.5 cells per square centimeter) and 2 mil (50 micron) thick wall structure, provided by existing production of honeycombed ceramic material for environmental purposes, has an OFA of 88%. An ultracapacitor or hybrid capacitor of the present invention thus offers the opportunity of approximately doubling the total electrode volume within a given volume, relative to typical current devices, thus potentially allowing the doubling of the energy density per unit volume also.

For a honeycomb structure 12 with a high cell count per unit area, the distance from any point on the electrode material to the nearest current collector is minimized, thus allowing for lower internal resistance and higher power output in the same volume device.

To achieve increased energy density and power density, it is useful to employ honeycomb structures having a density of greater than 100 honeycomb cells per square inch (15.5 cells per square centimeter), desirably at least 200 per square inch or 31 per square centimeter. For even higher performance, it is desirable to utilize cell densities of 400 and more per square inch (62 per square centimeter) or even 800 and more per square inch (124 per square centimeter). The honeycomb structure is presently capable of being produced with cell densities of up to 1600 cells per square inch (248 per square centimeter) and wall thickness down to 1 mil (about 25 microns). Utilizing honeycomb-structure supported current collectors allows for easy manufacturing of current collectors even with such high cell densities. By utilizing deposition processes to form separator-supported current collector structures—processes which can successfully introduce continuous coating structures into cells having both these small dimensions and large aspect ratios—high performance devices can be realized.

The ceramic honeycomb structure of the present invention provides a rigid durable packaging structure, while the porous walls simultaneously act as a separator. The porosity of the walls can be successfully adjusted to 50% or more. This compares to 30-40% porosity for typical separators, allowing better flow of the electrolyte through the structure.

Furthermore, essentially any type of electrode material may be used in the devices of the present invention: for example, intercalated carbon, synthetic carbon, carbon nanotubes, or combinations of these may be used, depending upon the mix of properties desired. Non-carbon electrodes may also be employed. The capacitors of the present invention are thus flexible in design to meet a wide range of needs.

Another possible advantage of capacitors structured according to the present invention is in cost. Up to 50% of the cost of the typical ultracapacitor device is in separator and packaging materials. The honeycomb structure with integral separator provides both package and separator at relatively low cost, since ceramic honeycomb technology is in large scale commercial production with very low cost manufacturing already demonstrated. The honeycomb is a useful package but is not merely a package. It provides structural integrity to the device.

The ceramic honeycomb structure is fabricated according to methods generally well known in the art. Depending on the composition desired (mullite, cordierite etc.), appropriate powdered raw materials such as clays or powdered inorganic oxides and hydroxides are mixed in proper proportion, then binders, such as methyl-cellulose binders, and plasticizers are added to the batch, with an appropriate amount of water. The batch is mixed, optionally with pore formers added, and then extruded through a die with desired cell density and wall thickness. The extruded honeycomb structure is then dried and fired at appropriate temperatures (e.g., ~1500 C for cordierite) to burn out binder (and pore formers, if any) and to sinter to a strong and porous honeycomb structure with high open frontal area. The cross section of the honeycomb cells may be circular, rectangular, triangular, hexagonal, or of other desired shape.

Next, alternate cell openings on one face of honeycomb may desirably be plugged. (It will be recognized that alternate plug and collector structures are possible.) The plugs 14 may contain inorganic powers with binders, which are then again fired to remove the binders and sinter the plugs. In an alternative method, the plugs 14 may be organic polymeric plugs of a material such as epoxy, fluoropolymer, silicones or another polymer which forms a good bond with the ceramic honeycomb and is compatible with the electrolyte. As an additional alternative, plugged honeycomb structure may be molded or extruded in one process step, as is known in the art. Whatever the process employed, the other face of the honeycomb structure is likewise plugged, ensuring that the geometry of the structure is as shown in FIG. 1.

As an alternative to ceramic for the material of the honeycomb structure 12, polymer honeycombs may be fabricated via extrusion of polymer powders, injection molding or other polymer forming methods known in the art, and alternate ends may likewise be plugged. As mentioned above, Thermoplastic and thermoset polymers such as PTFE (polytetrafluoroethylene), PVDF (polyvinylidene fluoride) Polypropylene, Polyethylene, Polycarbonate, epoxy, phenolic etc., may be used to fabricate polymer honeycombs.

The current collectors are then positioned on the internal walls of the honeycomb, such as by coating via any of a variety of techniques, such as electroplating, ink-jet printing followed by sintering, dip coating in molten metal, slurry coating from a slurry of metal particles, thermal evaporation, CVD, sputtering, e-beam evaporation, or other suitable techniques. These techniques are generally known in the art.

The non-galvanic electrode material, activated carbon, for example, may be obtained from any desired precursors such as natural or synthetic precursors. The activated carbon may be standard activated high surface area carbon, or carbon produced from intercalation processes (such as for example K intercalation) which may have relatively low surface area. Carbon nanotubes may also be used as an ingredient in the electrode material, whether in conjunction with activated carbon powder or without it. Other additives to the electrode to improve connectivity and conductivity may include powders such as carbon black, graphite, carbon nanofibers, metal powders, and the like. Desirably, a mixture of the above components in a selected proportion is made. Optionally, a binder such as a polymeric binder may be added to help create an electrode paste. Although it is anticipated that carbon will be preferred at least in the near term, electrode materials useable in the context of the present invention are not limited to carbon.

One method useful to assemble a device as shown in FIG. 1 includes fabricating a plugged honeycomb of the desired geometry and composition as mentioned above. This may be followed by metal coating of the walls. After metal coating, the honeycomb may be impregnated with the electrolyte. The electrode paste may then be squeezed into the cells of the honeycomb. Additional electrolyte may be diffused into the device after the electrode paste is filled in. The top and bottom metal contacts are then put in place and the device is sealed in an appropriate container to create the finished package.

A typical geometry for ceramic honeycomb structures comprises square shaped cells, such as represented in the diagrammatic cross section of FIG. 5. Although not required, for best energy and power density, every other cell, in both directions, should be of opposite polarity, as indicated by the signs in the Figure.

The honeycomb structure of the present invention is not limited to square shaped cells, however. Any cell geometry in which even numbers of walls meet at each wall meeting point can preserve the desirable ability to make every cell boundary a polarity boundary. This is illustrated schematically in FIGS. 6-8.

FIG. 6 shows an example of a triangular cell geometry in which six walls meet at each meeting point, and polarity can be arranged such that every wall is a polarity boundary. This alternative embodiment of the present invention may be desirable for its mechanical strength.

FIGS. 7 and 8 show examples of geometry in which the cells are not of one standard size. In the cell geometry represented in FIG. 7, there are four different rectangles, each with a different total area. In the cell geometry represented in FIG. 8, larger-area hexagons have smaller-area triangles interspersed. These alternative embodiments of the present invention having unequal area distributions among the cells are particularly to be used in embodiments of the present invention in which one or more galvanic electrodes are employed, i.e., in hybrid capacitor embodiments. Particular hybrid capacitor chemistries are optimized only with unequal-sized electrodes. The porous honeycomb structure with unequal-sized cells provides a mechanically strong separator structure that can hold the two different types of electrodes of a hybrid capacitor device, and define and control their respective sizes so as to insure optimized performance of the hybrid capacitor device.

Example 1

Figure 9:
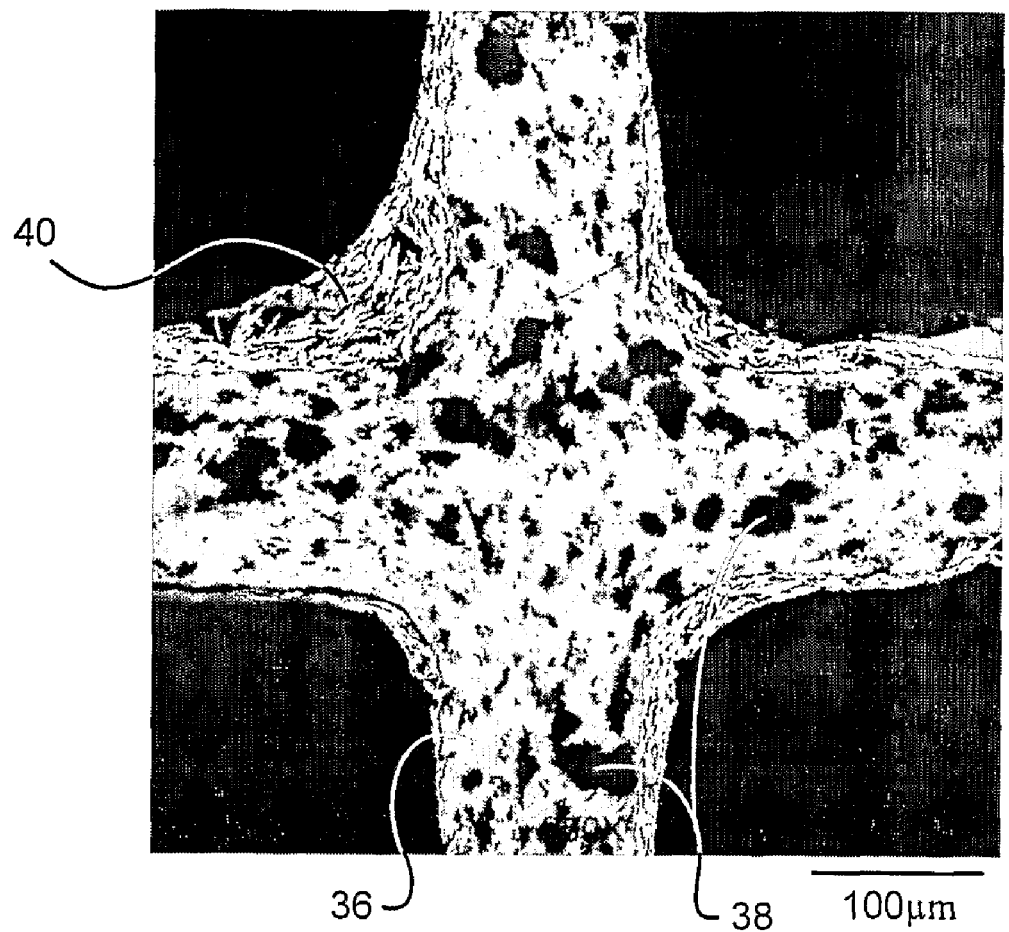
FIG. 9 is a scanning electron microscope (SEM) backscattered electron image of a polished cross-section of a structure similar to that represented in FIG. 5 above, taken at a magnification of 250×.

Experiments were carried out to demonstrate certain capabilities of metal coating on honeycomb walls. Colloidal silver was coated on a 600 cell per square inch (186 cell per square cm) 4 mil (100 micron) wall cordierite honeycomb structure via dip coating. This particular honeycomb had 40% porosity in the walls. The honeycomb walls were thoroughly coated with an electrically continuous coating of silver. Most importantly, fracture surface of the honeycomb showed that there was no penetration of silver particles in the honeycomb pore structure, indicating that this is a feasible approach to metal coating. FIG. 9 is a scanning electron microscope (SEM) backscattered electron image of a polished cross-section of an intersection within the resulting coated honeycomb structure, taken at a magnification of 250×, and showing the honeycomb material 36, the pores within the honeycomb material 38, and the silver layer 40 deposited on the surface of the honeycomb material 36 but not in the pores 38. As is apparent from the image of FIG. 9, the thickness of the deposition tends to be greater in the corners, which would allow for an etch-back process to form electrode structures as described above in connection with FIG. 4.

Example 2

Aluminum was thermally evaporated onto a cordierite honeycomb structure with dimensions of 600 cells per square inch (186 cells per square cm), 4 mil (100 micron) wall. An excellently adherent coating of aluminum was obtained on the walls. Porosity of the coating was demonstrated via a water drop test.

The invention claimed is:

1. An ultracapacitor or hybrid capacitor device comprising:
   an electrically non-conductive rigid or semi-rigid porous honeycomb structure having cells extending along a common direction;
   at least first and second electrodes contained within and extending along first and second ones of said cells, at least said first electrode being a high-surface-area non-galvanic electrode;
   at least one current collector structure extending along said first cell in electrical contact with said first electrode and supported on said separator structure; and
   an electrolyte in mutual contact with the first and second electrodes via the pores of the porous honeycomb structure.

2. The device according to claim 1 wherein said current collector structure comprises a porous layer of conductive material extending at least partially along the common direction on the entire inside surface of said first cell and wherein said electrolyte is in mutual contact with the first and second electrodes via the pores of the porous honeycomb structure and via the pores of said porous layer of conducting material.

3. The device of according to claim 1 wherein said current collector structure extends at least partially along the common direction on a plurality of discontinuous portions of the entire inside surface of said first cell.

4. The device according to claim 3 wherein the inside surface of said first cell includes inside corners and wherein said current collector structure extends at least partially along the common direction, principally in the inside corners of the inside surface of said first cell.

5. The device according to claim 3 wherein said current collector structure comprises a porous metal layer.

6. The device according to claim 3 wherein said current collector structure comprises a nonporous metal layer.

7. The device according to claim 1 wherein the current collector structure is about 20 microns thick or less.

8. The device according to claim 1 wherein the current collector structure is about 10 microns thick or less.

9. The device according to claim 1 wherein the honeycomb structure comprises an oxide or non-oxide ceramic material.

10. The device according to claim 1 wherein the ceramic material is one of cordierite, silicon nitride, aluminum titanate, alumina, zircon, glass and glass-ceramic.

* * * * *